United States Patent [19]

Shikasho

[11] 4,453,411

[45] Jun. 12, 1984

[54] PRESSURE MEMORY DEVICE

[75] Inventor: Satoru Shikasho, Chicago, Ill.

[73] Assignee: International Telephone and Telegraph Corporation, New York, N.Y.

[21] Appl. No.: 380,688

[22] Filed: May 21, 1982

[51] Int. Cl.³ .............................................. G01L 7/00
[52] U.S. Cl. ........................................ 73/709; 73/756
[58] Field of Search ................... 73/709, 706, 756, 710

[56] References Cited

U.S. PATENT DOCUMENTS

| | | | |
|---|---|---|---|
| 323,992 | 8/1885 | Wilcox | 73/756 |
| 3,233,462 | 2/1966 | Kuter et al. | 73/709 |

Primary Examiner—Donald O. Woodiel
Attorney, Agent, or Firm—James B. Raden; Donald J. Lenkszus

[57] ABSTRACT

A pressure memory device is used in conjunction with a pressure gauge to measure the highest or lowest liquid pressure in a system and to retain that measurement. The device comprises a manifold having a through bore with a check valve disposed therein. By connecting a pressure gauge to one end of the through bore and coupling the other end of the through bore to a fluid system, the check valve will trap fluid between the check valve and the pressure gauge.

4 Claims, 4 Drawing Figures

PRESSURE MEMORY DEVICE

BACKGROUND OF THE INVENTION

This invention pertains in general to pressure measuring devices.

In analyzing fluid systems of various types for system pressure problems, such as high pressure switch tripping, relief valve release or pump volute cracking, it is desirable to know the highest or lowest pressure attained prior to the failure. The two most commonly used methods are by attaching a recording instrument or a special pressure gauge having a follower pointer to the system. The use of a recording instrument is very expensive. The use of a special pressure gauge has drawbacks in that a separate gauge must be purchased for each pressure range and dial size desired and two separate gauges are required for the high and low pressure indications.

SUMMARY OF THE INVENTION

In accordance with the principles of the invention, a device is provided which may be utilized with any commercially available pressure gauge for measuring the highest or lowest fluid pressure in a system.

In accordance with the principles of the invention, a manifold device is provided with a sensitive check valve. The activating fluid pressure is trapped between a gauge and the check valve.

BRIEF DESCRIPTION OF THE DRAWINGS

The invention may be better understood from a reading of the following detailed description in conjunction with the drawings in which.

DETAILED DESCRIPTION

Figure 1:
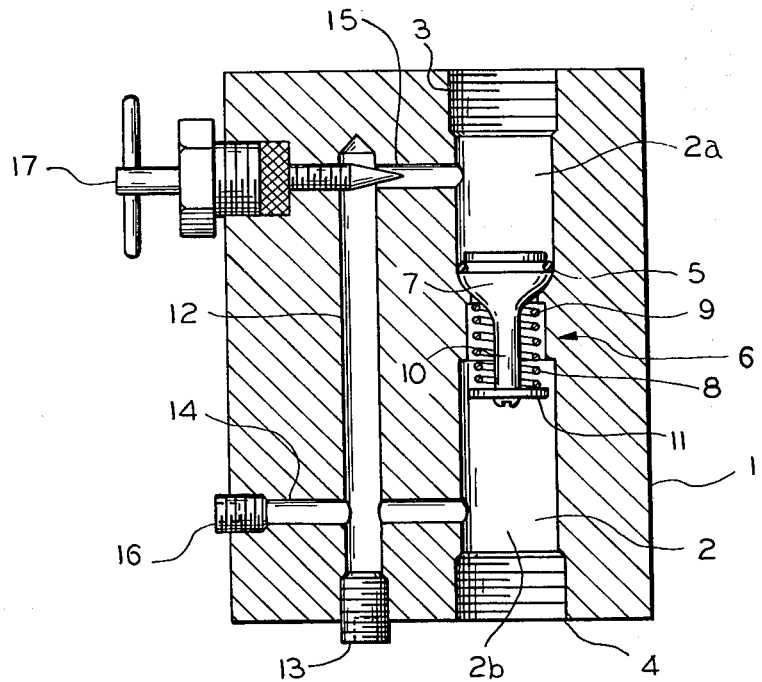
FIG. 1 illustrates in cross-section a device in accordance with the principles of the invention.

FIG. 1 illustrates a pressure memory device in accordance with the invention. A manifold 1 is machined from a brass block. The manifold 1 includes a first through bore 2 which is threaded at its ends 3, 4. The bore is machined to include a valve seat surface 5 adapted to engage a zero leakage check valve of the type commercially available such as "circle seal" series 2259B. The check valve 6 includes valve member 7 having an O-ring type seal, a spring 8 surrounding the stem 10 valve member 7. The spring 8 at one end engages a machined surface 9 in bore 2 and its other end engages washer 11 carried on the valve stem. The check valve divides bore 2 into two chambers 2a, 2b. A second bore 12 is positioned substantially parallel to the through bore 2. The lower end of bore 12 is sealed with a plug 13. Two horizontal bores 14 and 15 intersect the second bore 12 terminating in the through bore 2. The bore 14 is sealed with a plug 16. A valve 17 is secured in bore 15. The bores 12, 14 and 15 together form a bypass flow channel around the check valve 6.

Figures 2, 3, 4:
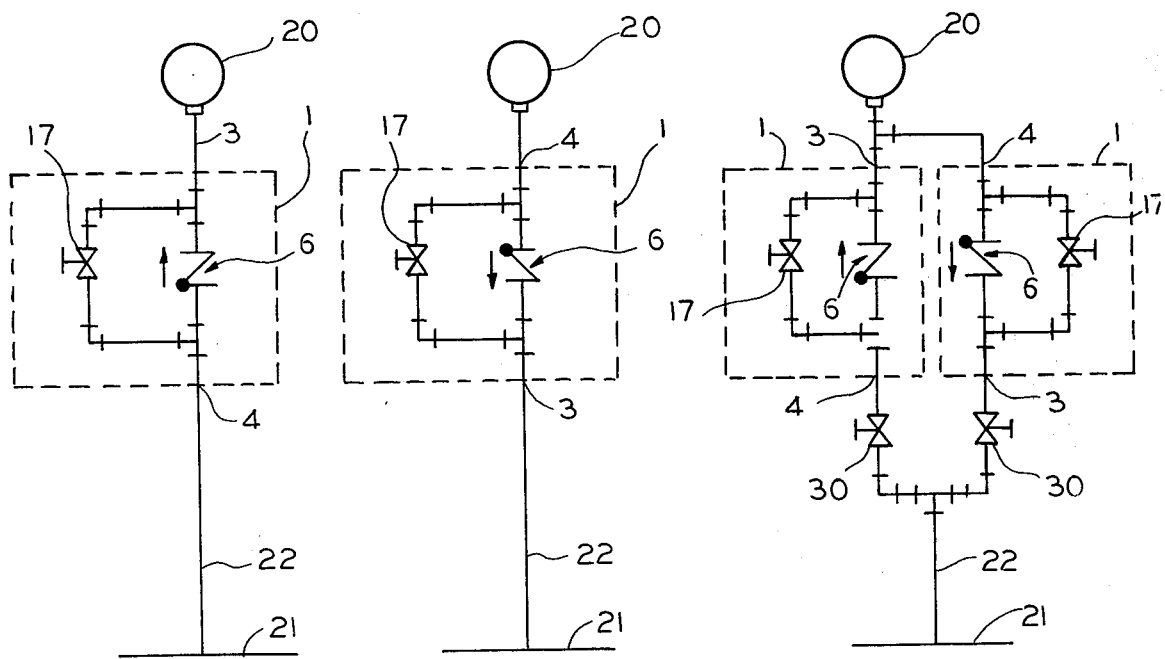
FIGS. 2, 3 and 4 illustrate in schematic form the connection of the device of FIG. 1 to a fluid system.

Manifold 1 may be used in conjunction with a pressure gauge to measure the highest or the lowest pressure which occurs in a system. FIGS. 2 and 3 show in schematic form the connection of manifold 1 to a pressure gauge 20 and to a pressurized system to measure the highest or lowest pressure, respectively.

In FIG. 2, the pressure gauge 20 is connected to threaded end 3 of manifold 1. Threaded end 4 is connected to the system piping 21 via pipe 22.

With bypass valve 17 closed, the fluid pressure in system piping 21 will urge the check valve to the open position and gauge 20 will measure the pressure. As pressure in the system increases, a pressure differential between chambers 2a and 2b will cause the check valve to remain open. If the system pressure becomes constant, no pressure differential exists between chambers 2a and 2b and check valve 6 will close. When check valve 6 closes, the fluid in chamber 2a is trapped between the gauge 20 and check valve 6. The trapped fluid will be under the pressure the system had prior to check valve 6 closing.

Likewise, a decrease in the system fluid pressure will retain the check valve 6 in the closed position. If pressure in the system piping increases to the point that pressure in chamber 2b is greater than that in chamber 2a, a pressure differential between chambers 2a and 2b will cause check valve 6 to open allowing the chamber 2a to again become pressurized to the same level as the system piping.

Thus, the fluid trapped in chamber 2a will be at the highest peak pressure occurring in the system piping 21. Pressure gauge 20 will, of course, measure the pressure in chamber 2a. If it is desired, bypass valve 17 may be opened to relieve the pressure in chamber 2a and reset the gauge 20.

It should be noted that by limiting the volume of the trapped fluid, i.e., by making chamber 2a small, the volumetric expansion error may be minimized.

A device constructed in accordance with FIG. 1 and utilized to measure a peak pressure was disconnected from the system and has retained the pressure in chamber 2a for greater than one year with no noticeable change in the pressure reading indicated on the gauge attached thereto.

By connecting threaded end 3 of the manifold 1 to the system piping 21 and connecting the pressure gauge 20 to threaded end 4 as shown in FIG. 3, the lowest pressure occurring in the system piping 21 can be measured. Chamber 2a is now coupled to the system piping 21 and chamber 2b is coupled to the gauge 20. Each time the fluid pressure in system piping 21 decreases such that the pressure in chamber 2a is less than the pressure in chamber 2b, check valve 6 will open allowing the pressures in chambers 2a and 2b to equalize. When pressure in chambers 2a and 2b equalize or if the pressure in chamber 2a increases, the valve 6 will close trapping the fluid in chamber 2b.

Bypass valve 17 may be opened to relieve the pressure in chamber 2b and reset the gauge 20. By connecting two manifolds 1 to a single pressure gauge and by providing appropriate selector valves 30, as shown in FIG. 4, an arrangement is provided for measuring the highest or lowest pressure occuring in the system.

What is claimed is:

1. A pressure memory device for use with a pressure gauge to measure an extreme in pressure occurring in a fluid system, said device comprising:

a body member having a through bore, said body member being adapted at one end of said through bore for connecting to a pressure gauge, said body member being adapted at another end for connecting to a fluid system;

a check valve disposed within said bore, said check valve dividing said through bore into first and second chambers;

said check valve being responsive to a positive pressure differential between said first and second chambers to establish fluid communication between said first and second chambers, said check valve being responsive to substantially zero or negative pressure differentials between said first and second chambers for closing to prevent fluid communication therebetween;

a passage for providing fluid communication between said first and second chambers bypassing said check valve, said passage comprises a first blind bore parallel to said through bore a first means for sealing the open end of said first blind bore, a second bore extending through said first blind bore and having one end opening into said first chamber, a third bore extending through said first blind bore and having one end opening into said second chamber, second sealing means for sealing the other end of one of said second or third bores; and a valve for opening and closing said passage, said valve being inserted into the other end of said second or third bores.

2. A pressure memory device in accordance with claim 1, wherein said first chamber is adjacent said body member another end, said second chamber is adjacent said body member one end and whereby said check valve traps fluid in said second chamber when said check valve closes, said trapped fluid being at the highest pressure occurring in said system.

3. A pressure memory device in accordance with claim 1, wherein said first chamber is adjacent said body member one end, said second chamber is adjacent said body member another end, and whereby said check valve traps fluid in said first chamber when said check valve closes, said trapped fluid being at the lowest pressure previously occurring in said system.

4. A device in accordance with claim 1, 2 or 3, wherein said body member comprises a brass block.

* * * * *